A. PENINGTON, Jr.
Cotton and Corn Planters.
No. 144,562. Patented Nov. 11, 1873.
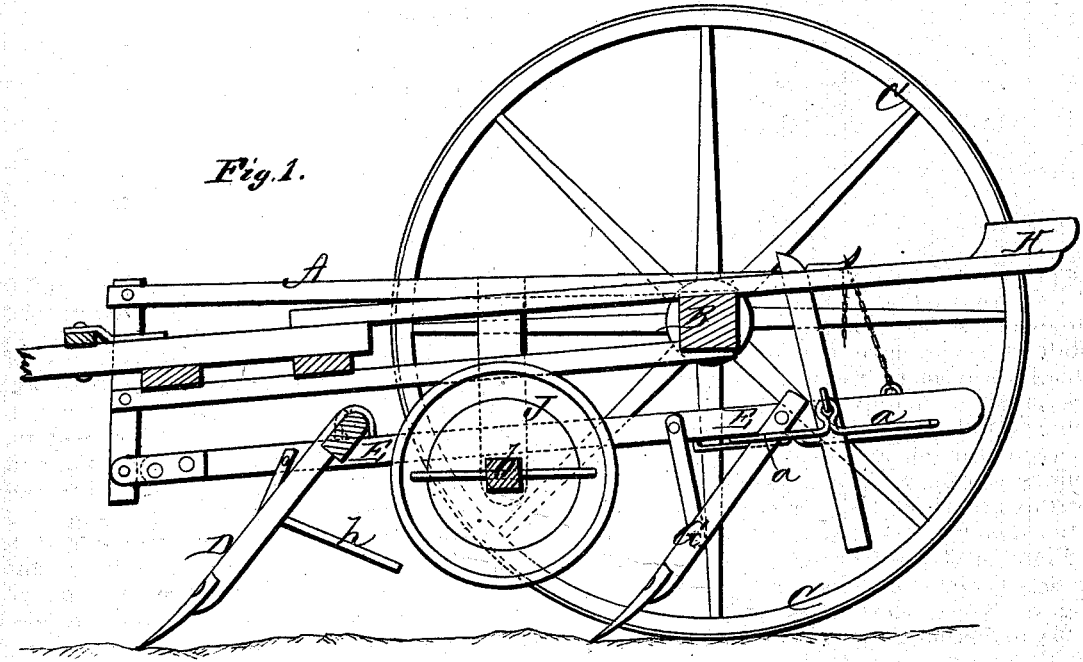
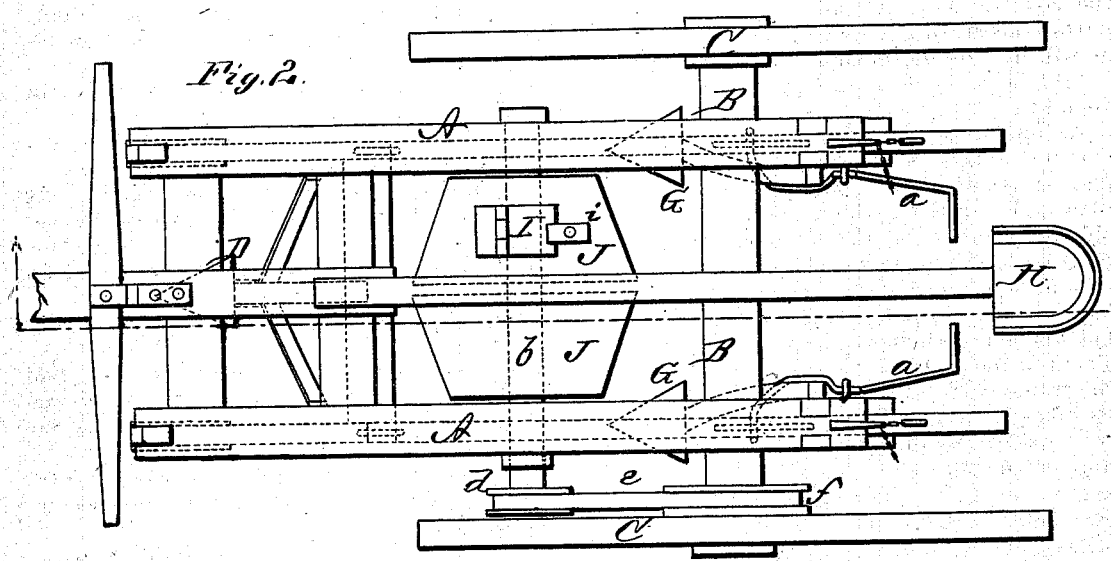
Witnesses.
E. P. Bates.
George E. Upham.
Inventor.
Asa Penington, Jr.
Chipman Hosmer & Co,
Attys.

UNITED STATES PATENT OFFICE.

ASA PENINGTON, JR., OF BRENHAM, TEXAS.

IMPROVEMENT IN COTTON AND CORN PLANTERS.

Specification forming part of Letters Patent No. 144,562, dated November 11, 1873; application filed August 2, 1873.

*To all whom it may concern:*

Be it known that I, ASA PENINGTON, Jr., of Brenham, in the county of Washington and State of Texas, have invented a new and valuable Improvement in Cotton and Corn Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my machine in longitudinal section, and Fig. 2 is a plan view of the same.

My invention relates to machines used for planting cotton and corn; and it consists in the construction and novel arrangement of parts constituting a cotton and corn planter, as will be hereinafter more fully set forth.

Like letters of reference indicate corresponding parts.

A represents the frame, B the axle, and C C the wheels, of a light sulky, to which the planter is attached. The planter uses three plows, D and G G, which are fastened to an oblong frame-work, E, under the wagon, the front end of said frame being hinged or pivoted and the rear end controlled by means of foot-levers $a$ $a$, upon which levers the driver has his feet, he being seated on his seat at H. The first plow D is fastened to the fore part of the frame-work E, directly in the center, and its office is to open the furrow in which the seed are to be deposited. J J represent the hopper, made of sheet iron, in the shape of a keg or barrel, divided or cut through across the center. The hopper is fastened on a shaft, $b$, upon one end of which is a pulley, $d$, connected by a belt, $e$, with a pulley, $f$, on the side of one of the wheels C. By this means the hopper is rotated by the motion of the machine. The two halves of the hopper do not come close together, but leave a small space between them, through which opening the seed is dropped. In order to prevent choking there is a small rod, $h$, attached to the foot-piece of the plow D. This rod extends back from the plow and enters the opening between the two halves of the hopper, and as the hopper revolves the seed are stirred up by said rod, causing them to drop freely through said opening. One of the halves J of the hopper is provided with a door, I, which fastens with a button, $i$, and through which the seed are put in. The plows G G are attached on opposite sides of the frame E, just in rear of the hopper, to cover the seed.

A stationary corn-hopper may be attached to this machine for dropping corn, and is only intended as an attachment for the cotton-planter.

These hoppers may be removed and the plows used as cultivators.

What I claim as new, and desire to secure by Letters Patent, is—

1. The hinged or pivoted frame E, carrying the plows D and G G, and adjusted by the foot-levers $a$ $a$, in combination with the revolving seed-hoppers J J, substantially as and for the purposes herein set forth.

2. The combination of the sulky A B C with seat H, hinged frame E, plows D and G G, foot-levers $a$ $a$, revolving seed-hopper J J, and stirring-rod $h$, all constructed and arranged substantially as and for the purposes herein set forth.

In testimony that I claim the above I have hereunto subscribed my name in the presence of two witnesses.

ASA PENINGTON, JR.

Witnesses:
 RIGGS PENINGTON,
 HENRY M. FURMAN.